United States Patent
Kim et al.

(10) Patent No.: US 6,598,758 B2
(45) Date of Patent: Jul. 29, 2003

(54) CUP TRANSFER DEVICE FOR VENDING MACHINE

(75) Inventors: Jung-gi Kim, Kwangju (KR); Man-seob Lee, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 10/016,912

(22) Filed: Dec. 14, 2001

(65) Prior Publication Data
US 2002/0113078 A1 Aug. 22, 2002

(30) Foreign Application Priority Data

Feb. 19, 2001 (KR) .................................. 2001-0008271
Mar. 8, 2001 (KR) .................................. 2001-0011956
Jul. 10, 2001 (KR) .................................. 2001-0041126

(51) Int. Cl.7 ............................................. G07F 11/00
(52) U.S. Cl. ......................................... 221/7; 221/258
(58) Field of Search ........................ 221/258, 7, 9, 221/119, 188, 251, 237

(56) References Cited

U.S. PATENT DOCUMENTS

| 4,480,764 A | 11/1984 | Takagi et al. |
| 5,261,467 A | 11/1993 | Yamamoto et al. |
| 5,503,300 A | 4/1996 | Prescott et al. |
| 2002/0113078 A1 * | 8/2002 | Kim et al. ............... 221/258 |

FOREIGN PATENT DOCUMENTS

JP 2089208 3/2002

* cited by examiner

Primary Examiner—Kenneth W. Noland
(74) Attorney, Agent, or Firm—Ladas & Parry

(57) ABSTRACT

A cup transfer device of a vending machine capable of accurately controlling the stop position of a cup holder having a cup holder; a means for driving the cup holder; a means for controlling the position of the cup holder; and a means for adjusting the position of the cup holder. The position adjusting means includes a position adjusting detent formed at an outer circumference of a sensing disk and a roller pressed to the outer circumference of the sensing disk by a resilient member.

6 Claims, 4 Drawing Sheets

CUP TRANSFER DEVICE FOR VENDING MACHINE

BACKGROUND OF THE INVENTION

1. Field of the Invention

The present invention relates generally to a vending machine, and more particularly to a cup transfer device for a vending machine that transfers a supplied cup from a cup supply device between a cup supply unit and a low material discharging hole.

2. Description of the Related Art

A conventional cup transfer device 10 of a vending machine is shown in FIG. 1. The cup transfer device 10 of the vending machine shown in FIG. 1 is an undisclosed prior art device of the assignee of the present invention, thus, it cannot be used as a ground for rejecting the present invention.

Referring to FIG. 1, the conventional cup transfer device 10 of the vending machine comprises a cup holder 110, a driving means 120, and a position control means 130. The cup holder 110 comprises a holder body 111 and a cup hold unit 112 for embracing a cup.

The driving means 120 includes a motor 121 (shown in phantom) and a gear box 122 (shown in phantom). Rotational force of the motor 121 is amplified by the gear box 122, and provides rotational energy to a rotary shaft 123. Accordingly, the cup holder 110, secured to the rotary shaft 123, also rotates.

The position control means 130 comprises a sensing disk 131 and a pair of sensors 132 and 133. The sensing disk 131 is secured to the cup holder 110 by an appropriate means, such as the pins shown, and the pair of sensors 132 and 133 are secured to a base plate 101 by a bracket 134.

A plurality of sensing detents 132a, 133a and 133b are formed along an outer circumference 135 of the sensing disk 131. Alternatively, the sensing disk 131 can be formed integrally with the cup holder 110. Original point and stop positions of the cup holder 110 are controlled in accordance with a reciprocal movement of the pair of sensors 132 and 133 in the sensing detents 132a, 133a and 133b. In other words, the original point of the cup holder 110 is controlled by the relative movement of the sensor 132 in the sensing detent 132a, and the stop position of the cup holder 110 is controlled by the relative movement of the sensor 133 in the sensing detents 133a and 133b.

For the conventional cup transfer device 10 of the vending machine with the above described construction, if the stop position of the cup holder 110 is sensed by the sensor 133 and the sensing detents 133a and 133b, the stop position of the cup holder 110 is controlled by stopping the operational rotation of the motor 121.

However, according to the position control method of the cup holder 110 as described above, the cup holder 110 sometimes cannot stop at the appropriate place due to inertial forces of a rotary body or the change of viscosity of grease inside of the gear box 122 caused by a change in the weather.

In the above case, supplying of the cup and discharging of the ice cream cannot be performed actively. Accordingly, the vending machine might be polluted because the ice cream is discharged to the wrong place and the useful credibility of the vending machine can be damaged.

SUMMARY OF THE INVENTION

The present invention has been made to overcome the above-mentioned problems of the related art. Accordingly, it is an object of the present invention to provide a cup transfer device of a vending machine capable of accurately controlling a stop position of a cup holder.

The above object of the present invention is accomplished by providing a cup transfer device of a vending machine, comprising a cup holder; means for driving the cup holder; means for controlling a position of the cup holder; and means for adjusting a position of the cup holder.

The driving means includes a motor and gear box, the position control means is secured to the cup holder, and includes a sensing disk having a plurality of sensing detents formed at an outer circumference and a pair of sensors that reciprocate with the sensing detents. Moreover, in various preferred embodiments of the present invention, the position adjusting means can include position adjusting detents formed at an outer circumference of a sensing disk and a roller urged toward the outer circumference of the sensing disk by a resilient member, and also can include a position adjusting detent formed at an outer circumference of a sensing disk and a wedge member for selectively engaging with the position adjusting detent or can include a magnetic material attached at an outer circumference of a sensing disk and an electromagnet for selectively operating with the magnetic material.

DETAILED DESCRIPTION OF THE PREFERRED EMBODIMENTS

Figure 1:
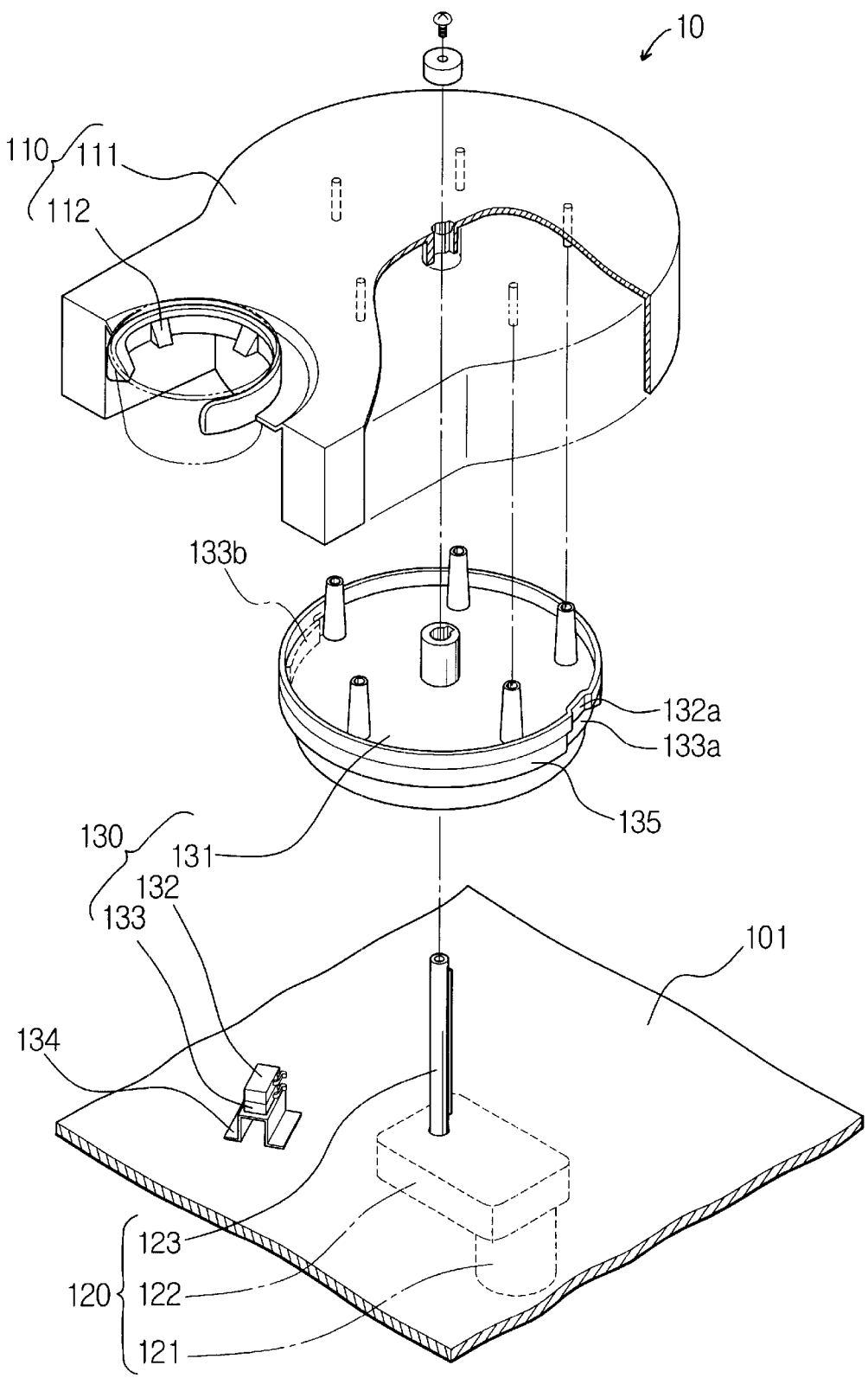
FIG. 1 is an exploded perspective view showing an important part of a conventional cup transfer device of a vending machine.

The preferred embodiments of the present invention will be described below by referring to the accompanying drawings. Throughout the description, the like elements will be given the same reference numerals of the conventional cup transfer device shown in FIG. 1, so as to omit redundant description.

Figure 2:
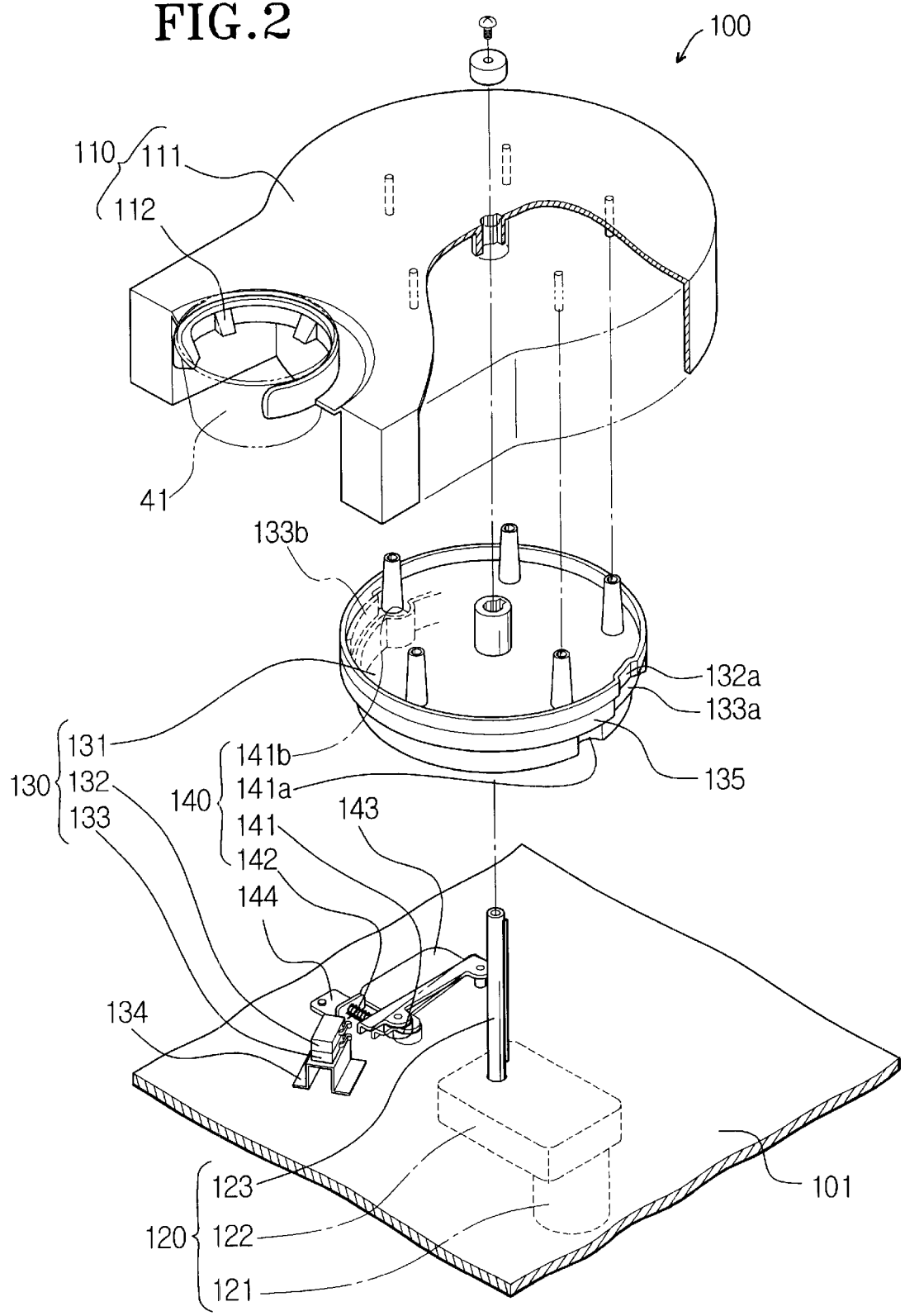
FIG. 2 is an exploded perspective view showing an important part of a cup transfer device in accordance with the present invention.

A cup transfer device of a vending machine according to the present invention is shown in FIG. 2. Referring to FIG. 2, the cup transfer device 100 of the vending machine according to the present invention comprises a cup holder 110, a driving means 120, a position control means 130, and a position adjusting means 140.

The cup holder 110 comprises a holder body 111 and a cup hold unit 112. The holder body 111 is cylindrically formed with an open lower part. A cup holding unit 112 for embracing a cup 41 is formed at an outer circumference of the holder body 111.

The driving means 120 includes a motor 121 and a gear box 122 (both shown in phantom). A rotational force of the motor 121 is amplified by the gear box 122 and the rotational force is output through a rotary shaft 123. Accordingly, the cup holder 110, secured to the rotary shaft 123, also rotates.

The position control means 130 comprises a sensing disk 131 and a pair of sensors 132 and 133. The sensing disk 131 is secured to the cup holder 110, and the pair of sensors 132 and 133 are secured to a base plate 101 by a mounting bracket 134. Alternatively, the sensing disk 131 can be formed integrally with the cup holder 110.

A plurality of sensing detents 132a, 133a and 133b are formed at an outer circumference of the sensing disk 131. Original point and stop positions of the cup holder 110 are controlled by a relative movement of the pair of sensors 132 and 133 in the sensing detents 132a, 133a and 133b. In other words, the original point of the cup holder 110 is controlled by the relative movement of the sensor 132 in the sensing detent 132a, and the stop position of the cup holder 110 is controlled by the relative movement of the sensor 133 in the sensing detents 133a and 133b.

The position adjusting means 140 comprises a roller 141, a resilient member 142, and position adjust detents 141a and 141b. The position adjust detents 141a and 141b are formed at a second outer circumference of the sensing disk 135, and the roller 141 is rotatably supported by a roller holder 143.

The roller holder 143 is pivotably supported by the roller 141. One end of the resilient member 142 is connected to a bracket 144 secured to the base plate 101, and the other end of the resilient member 142 urges the roller holder 143 toward the direction of the sensing disk 131.

Therefore, the roller 141 is pressed to the outer circumference of the sensing disk 131, and a stop position of the sensing disk 131 is adjusted by relative movement of the roller 141 in the position adjust detents 141a and 141b. Accordingly, the stop position of the cup holder 110 is securely adjusted.

For the cup transfer device 100 of the vending machine according to the present invention with the above construction, even when the cup holder 110 stops at a position deviated from its exact stop point, the position of the cup holder 110 is again adjusted to an exact point by the position adjusting means 140.

Figure 3:
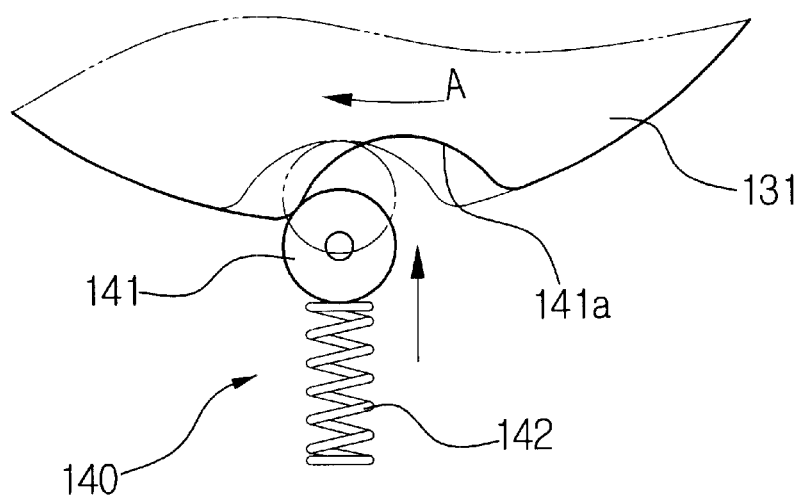
FIG. 3 is a detailed view showing the operation of a position adjusting means of the cup transfer device in accordance with the present invention.

In other words, as shown in FIG. 3, although the cup holder 110 stops at a position deviated from its desired exact stopping point, the position of the sensing disk 131 is adjusted as shown in the phantom dotted line depiction of the detent 141a shown in FIG. 3, as the roller 141 is advanced by a pressing force of the resilient member 142.

That is, as the roller 141 is urged against the wall of the position adjusting detent 141a of the sensing disk 131 by the resilient member 142, the sensing disk 131 is rotated in a direction of the arrow A by the sloping wall of detent 141a, as shown in FIG. 3, and thus, the position of the cup holder 110 is adjusted.

Figure 4A:
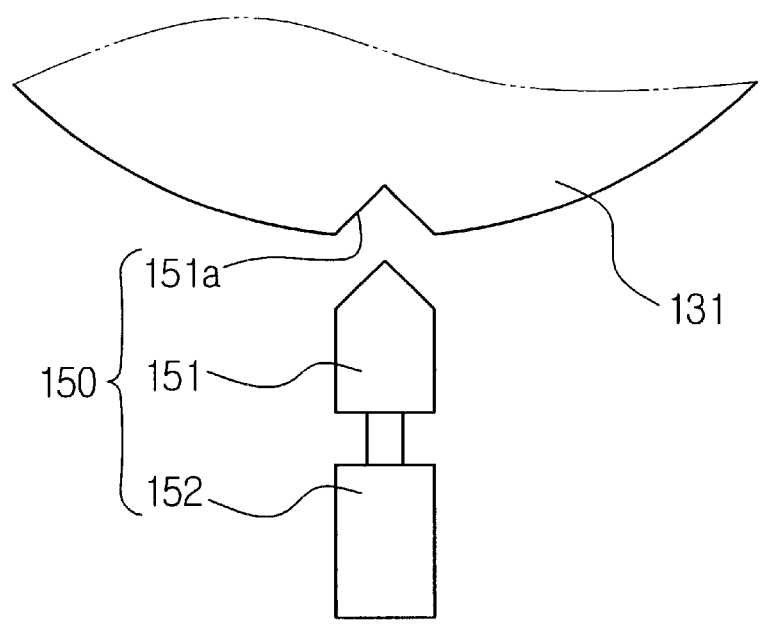
FIGS. 4A through 4C are detailed views showing the cup transfer device in accordance with other preferred embodiments of the present invention.
Figure 4B:
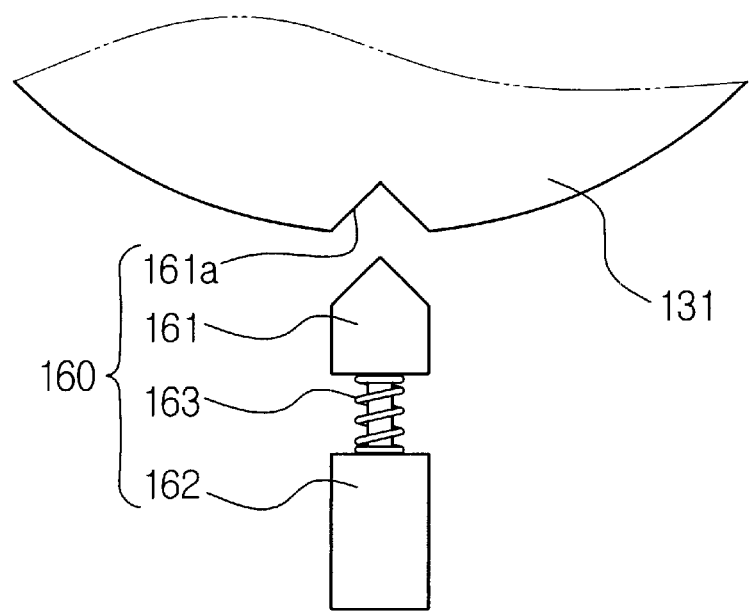

The cup transfer devices 100 of the vending machine according to other preferred embodiments of the present invention are shown in FIGS. 4A through 4B.

As shown in FIGS. 4A and 4B, position adjusting means 150 has a similar construction as the position adjusting means 140 of FIG. 3, except that the position adjusting means 150 comprises a wedge member 151 instead of the roller 141, and a bi-directional solenoid 152 instead of the resilient member 142.

In addition, position adjusting means 160 shown in FIG. 4B has a similar construction as the position adjusting means 140 of FIG. 3, except that the position adjusting means 150 comprises a wedge member 161, instead of the roller 141, and a unidirectional solenoid 162 and a resilient member 163.

Figure 4C:
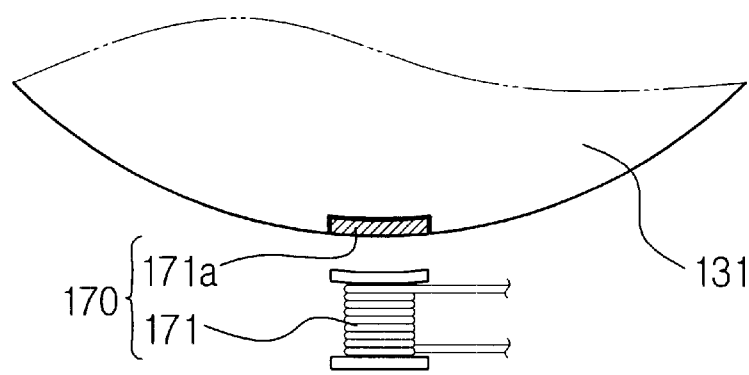

Moreover, position adjusting means 170 shown in FIG. 4C has a similar construction as the position adjusting means 140 of FIG. 3, except that the position adjust means 170 comprises a magnetic material 171a, instead of the position adjust hole 141a, and an electromagnet 171, instead of the roller 141 and the resilient member 142.

Furthermore, the construction and the operation of the position adjusting means of the other preferred embodiments, as described above, can be understood by those skilled in the art by referring to the drawings. Therefore, the detailed description thereof will be omitted here.

On the other hand, the undesignated reference numerals 151a of FIG. 4A and 161a of FIG. 4B are position adjusting detents corresponding to the position adjusting detents 141a and 141b of FIG. 2. The detailed form of the position adjusting detents 151a and 161a should correspond to the form of the wedge members 151 and 161, respectively.

According to the cup transfer device 100 of the vending machine of the present invention as describe above, although the cup holder 110 stops at a position deviating from its exact stop point, the position of the cup holder 110 is adjusted by the position adjusting means 140, and thus, the stop position of the cup holder 110 can be exactly controlled.

Although the preferred embodiments of the present invention have been described, it will be understood by those skilled in the art that the present invention should not be limited to the described preferred embodiments, and various changes and modifications can be made within the spirit and scope of the present invention as defined by the appended claims.

What is claimed is:

1. A cup transfer device of a vending machine, comprising:

a cup holder;

means for driving the cup holder;

means for controlling a position of the cup holder; and means for adjusting a position of the cup holder.

2. The cup transfer device of the vending machine of claim 1, wherein the driving means includes a motor and a gear box.

3. The cup transfer device of the vending machine of claim 1, wherein the position control means includes:

a sensing disk secured to the cup holder and having a plurality of sensing detents formed at an outer circumference; and a pair of sensors that relatively moved in the sensing detents.

4. The cup transfer device of the vending machine of claim 1, wherein the position adjusting means includes:

a portion defining a position adjusting detent at an outer circumference of a sensing disk; and a roller urged toward the outer circumference of the sensing disk by a resilient member.

5. The cup transfer device of the vending machine of claim 1, wherein the position adjusting means includes:

a portion defining a position adjusting detent at an outer circumference of a sensing disk; and a wedge member for selectively engaging with the position adjusting detent.

6. The cup transfer device of the vending machine of claim 1, wherein the position adjusting means includes:

a magnetic material attached to an outer circumference of a sensing disk; and an electromagnet for selectively acting upon the magnetic material.

* * * * *